(12) United States Patent  
Chuang et al.

(10) Patent No.: US 7,793,116 B2
(45) Date of Patent: Sep. 7, 2010

(54) POWER SUPPLY SYSTEM WITH REMOTE CONTROL CIRCUIT AND POWER SUPPLY SYSTEM OPERATION METHOD

(75) Inventors: Chih-Tarng Chuang, Taipei (TW); Shih-Chin Lu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 951 days.

(21) Appl. No.: 11/560,843

(22) Filed: Nov. 17, 2006

(65) Prior Publication Data

US 2008/0054863 A1     Mar. 6, 2008

(30) Foreign Application Priority Data

Sep. 1, 2006    (TW) ............... 95132306 A (51) Int. Cl.
*G06F 1/26*     (2006.01)
(52) U.S. Cl. ...................................... 713/300; 713/340
(58) Field of Classification Search ................ 713/300, 713/310, 340; 320/137, 149
See application file for complete search history.

(56) References Cited

U.S. PATENT DOCUMENTS 6,498,461 B1 * 12/2002 Bucur .......................... 320/145
2004/0178766 A1 * 9/2004 Bucur et al. ................ 320/112
2004/0195996 A1 * 10/2004 Nishida ........................ 320/103
2006/0187689 A1 * 8/2006 Hartular ........................ 363/63

FOREIGN PATENT DOCUMENTS

| JP | 08-237872 | 9/1996 |
| JP | 11-285168 | 10/1999 |
| JP | 2002142381 | 5/2002 |
| JP | 2006158103 | 6/2006 |
| JP | 2006197688 | 7/2006 |
| TW | I221692 | 10/2004 |

* cited by examiner

*Primary Examiner*—Mark Connolly
*Assistant Examiner*—Paul B Yanchus, III
(74) *Attorney, Agent, or Firm*—Jianq Chyun IP Office (57) ABSTRACT

A power supply system with a remote control circuit and a power supply system operation method are provided. The power supply system uses a remote control power supply device and a battery to provide a system with power, while the remote control circuit includes a first-resistor, a first-operational amplifier, a second-operational amplifier and a selection circuit. The first-resistor herein is coupled between the remote control power supply device and the battery. The first-operational amplifier detects the current passing through the first resistor so as to output a first control signal. The second-operational amplifier detects the battery voltage so as to output a second control signal. The selection circuit outputs one of the first control signal and the second control signal with a lower voltage and the output signal is served as a remote control signal to adjust the voltage of the remote control power supply device.

27 Claims, 4 Drawing Sheets

POWER SUPPLY SYSTEM WITH REMOTE CONTROL CIRCUIT AND POWER SUPPLY SYSTEM OPERATION METHOD

CROSS-REFERENCE TO RELATED APPLICATION

This application claims the priority benefit of Taiwan application serial no. 95132306, filed Sep. 1, 2006. All disclosure of the Taiwan application is incorporated herein by reference.

BACKGROUND OF THE INVENTION

1. Field of the Invention

The present invention generally relates to a power supply system and a power supply system operation method. More particularly, the present invention relates to a power supply system with a remote control circuit and to a power supply system operation method capable of simultaneously supplying a system with power through a power supply device and a battery.

2. Description of Related Art

The stability of the power source is very critical to the current electronic products. If an electronic product is supplied by unstable power, the stability and the reliability thereof would be affected. Therefore, in order to improve the power source stability, some electronic products are equipped with a power supply device and a battery to simultaneously provide the products with the required powers, as shown by FIG. 1.

Figure 1:
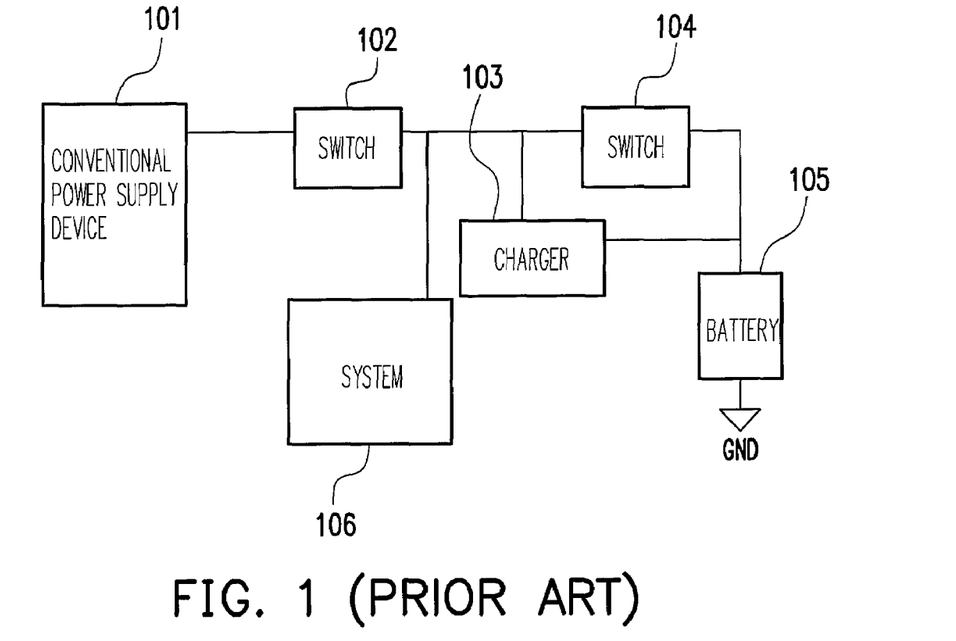
FIG. 1 is a diagram of a conventional power supply system.

FIG. 1 is a diagram of a conventional power supply system. Referring to FIG. 1, the conventional power supply system of FIG. 1 includes a conventional power supply device 101, a first switch 102, a charger 103, a second switch 104, a battery 105 and a system 106, wherein the output power of the conventional power supply device 101 is assumed 45 W. The conventional power supply device 101 supplies the system 106 with power through the first switch 102, meanwhile the conventional power supply device 101 charges the battery 105 through the first switch 102 and the charger 103 as well.

Since the prior art as shown by FIG. 1 is unable to keep the voltage of the conventional power supply device 101 the same as the voltage of the battery 105 by adjustment, thus, the conventional power supply device 101 and the battery 105 are not capable of simultaneously supplying the system 106 with power. When the load of the system 106 is increased to 50 W, the battery 105 is still unable to parallel supply the system with power; that is because the second switch 104 where the current I passes through uses a P-type metal-oxide-semiconductor transistor (PMOS transistor) containing a body diode and served as an isolation switch, so as to control supplying power to the battery 105 thereby. When the conventional power supply device 101 performs a protection action (for example, in the case where the load of the supplied system is beyond the rating output power of the conventional power supply device 101) or is not present, the second switch 104 would be on. Moreover, when the load of the system 106 is increased, the regular PMOS transistor containing a body diode fails to effectively rectify the current I, which results in burning the second switch 104 and further makes the battery 105 and the conventional power supply device 101 incapable of simultaneously supplying the system 106 with power.

In addition, since the prior art is unable to vary the output voltage of the conventional power supply device 101, the output voltage can not be adjusted within 9-13V to approximate the output voltage of the battery 105 and is accordingly unable to conform to the requirement of 'Narrow Direct Current Voltage 2' (also termed as 'Narrow VDC 2' or 'NVDC2') launched by Intel company. On the other hand, the conventional power supply device 101 is required to provide at least the electric power of the load of the system 106, but it fails to achieve the goal by using other power source to provide a parallel power supply, therefore, the prior art can not flexibly design the volume of the conventional power supply device 101.

SUMMARY OF THE INVENTION

Accordingly, the present invention is directed to provide a power supply system with a remote control circuit, which allows a power supply device and a battery to simultaneously supply a system with power.

Another objective of the present invention is to provide a power supply system operation method, which is capable of supplying a system with power through a power supply device and a battery.

As embodied and described broadly herein, the present invention provides a power supply system having a remote control circuit, which allows a remote control power supply device (for example, a remote control AC/DC adaptor) and a battery to supply a system with power. The remote control circuit includes a first resistor, a first operational amplifier, a second operational amplifier and a selection circuit, wherein the first resistor is coupled between the remote control power supply device and the battery. The first operational amplifier is for detecting the current passing through the first resistor and accordingly outputs a first control signal. The second operational amplifier is for detecting the voltage of the battery and accordingly outputs a second control signal. The selection circuit outputs one of the first control signal and the second control signal with a lower voltage between the two control signals, wherein the control signal output from the selection circuit is served as a remote control signal for adjusting the voltage of the remote control power supply device, so that the voltage of the remote control power supply device is approximated to the voltage of the battery and the battery is charged not beyond a preset value.

As embodied and described broadly herein, the present invention further provides a power supply system operation method, which includes: detecting the charging current of the battery by using the first operational amplifier for outputting the first control signal; detecting the voltage of the battery by using the second operational amplifier for outputting the second control signal; outputting one of the first control signal and the second control signal with a lower voltage between the two control signals by using the selection circuit, wherein the output control signal is served as the remote control signal and fed into the remote control power supply device; adjusting the voltage of the remote control power supply device according to the remote control signal, so that the voltage of the remote control power supply device is approximated to the voltage of the battery and the battery is controlled to be charged not beyond a preset value.

According to the power supply system in an embodiment of the present invention, both input terminals of the above-mentioned first operational amplifier are respectively coupled to both ends of the first resistor, the first input terminal of the second operational amplifier is coupled to the first resistor and the battery, and the second input terminal of the second operational amplifier receives a second reference voltage. In addition, the remote control circuit further includes a second resistor, a third resistor, a fourth resistor, a fifth resistor, a sixth resistor and a seventh resistor.

Herein an end of the second resistor is coupled to the first resistor and the battery, while another end thereof is coupled to the inverting input terminal of the first operational amplifier. The third resistor is coupled between a first reference voltage and the inverting input terminal of the first operational amplifier. An end of the fourth resistor is coupled to the first resistor and the remote control power supply device, while another end thereof is coupled to the non-inverting input terminal of the first operational amplifier. An end of the fifth resistor is coupled to the non-inverting input terminal of the first operational amplifier, while another end thereof is grounded. An end of the sixth resistor is coupled to the first resistor and the battery, while another end thereof is coupled to the non-inverting input terminal of the second operational amplifier. An end of the seventh resistor is coupled to the non-inverting input terminal of the second operational amplifier, while another end thereof is grounded. The inverting input terminal of the second operational amplifier is coupled to the second reference voltage $V_{REF2}$.

According to the power supply system in an embodiment of the present invention, the selection circuit in the power supply system includes a first diode and a second diode. Herein the cathode of the first diode receives a first control signal, the cathode of the second diode receives a second control signal and the anodes of the above-mentioned two diodes are coupled to a node, where the remote control signal is output from.

According to the power supply system in an embodiment of the present invention, the power supply system further includes a first switch and a second switch, wherein a terminal of the first switch is coupled to the remote control power supply device and another terminal thereof is coupled to the battery and a system. If the remote control power supply device is present, the first switch is on, otherwise the first switch is off. The first terminal of the second switch is coupled to the first resistor and the system, the second terminal thereof is coupled to the battery and the second switch receives a charge control signal. If the charge control signal takes a charging status, the second switch is on in a bidirectional way, while if the charge control signal takes a non-charging status, the current path though the second switch from the battery to the system is on in a unidirectional way.

According to the power supply system in an embodiment of the present invention, the second switch includes a Schottky diode and a PMOS transistor. The Schottky diode herein is coupled between the first terminal and the second terminal of the second switch. The drain of the PMOS transistor is coupled to the first terminal of the second switch, the source thereof is coupled to the second terminal of the second switch and the second switch is turned on or off according to the charge control signal.

According to the power supply system in an embodiment of the present invention, the second switch includes a PMOS transistor, a logic circuit and a third operational amplifier. The drain of the PMOS transistor herein is coupled to the first terminal of the second switch, while the source thereof is coupled to the second terminal of the second switch. The logic circuit performs a logic operation on the charge control signal and provides the gate of the PMOS transistor with the charge control signal after the logic operation. When the charge control signal takes the non-charging status, the third operational amplifier detects the voltage between the drain and the source of the PMOS transistor through the two input terminals thereof and outputs a signal to the gate of the PMOS transistor, wherein the output signal is used to keep the above-mentioned voltage not higher than a preset voltage and keep the current path from the battery to the system on in a unidirectional way.

According to the power supply system operation method in an embodiment of the present invention, the power supply system herein further includes a switch, wherein the first terminal of the switch is coupled to the remote control power supply device and the system, the second terminal thereof is coupled to the battery and the switch receives the charge control signal. If the charge control signal takes a charging status, the switch is on in a bidirectional way, while if the charge control signal takes a non-charging status, the switch is on in a unidirectional way from the battery to the system.

According to the power supply system operation method in an embodiment of the present invention, the switch herein includes a PMOS transistor, wherein the drain of the PMOS transistor is coupled to the second terminal of the switch and the source thereof is coupled to the first terminal of the switch. The power supply system operation method further includes: performing a logic operation on the charge control signal and providing the gate of the PMOS transistor with the operated charge control signal; when the charge control signal takes a non-charging status, providing the gate of the PMOS transistor with an output signal according to the voltage between the drain and the source of the PMOS transistor, wherein the output signal is used to keep the above-mentioned voltage not higher than a preset voltage.

According to the power supply system and the power system operation method in an embodiment of the present invention, the charge control signal herein comes from an embedded controller (EC) and the EC provides the charge control signal according to the battery capacity.

According to the power supply system operation method in an embodiment of the present invention, the operation method further includes: if the load of the system is beyond the maximum output power of the remote control power supply device, providing the system with the maximum output power by the remote control power supply device and providing the system with the shortage of the required electric power by the battery; if the battery capacity is higher than the preset value and the load of the system is not beyond the maximum output power of the remote control power supply device, providing the system with power by the remote control power supply device and not charging the battery; if the battery capacity is lower than the preset value and the load of the system is not beyond the maximum output power of the remote control power supply device, providing the system with power by the remote control power supply device and charging the battery; if the battery capacity is lower than the preset value and the load of the system is beyond the maximum output power of the remote control power supply device, disabling the remote control power supply device to charge the battery, providing the system with the maximum output power by the remote control power supply device and providing the shortage of the required electric power by the battery.

Since the present invention utilizes two operational amplifiers to respectively detect the charging current of the battery and the voltage of the battery and selects one of the outputs of the two operational amplifiers to be fed into the remote control power supply device for adjusting the voltage of the remote control power supply device, the voltage of the remote control power supply device is approximated to the voltage of the battery and the charging current of the battery is controlled not beyond the preset value, therefore, the power supply system and the power supply system operation method of the present invention allow the remote control power supply device and the battery to simultaneously supply the system with power, and furthermore, the volume of the remote control power supply device can be flexibly designed as well.

In addition, the switch coupled to the battery in the present invention is implemented by using an operational amplifier and a PMOS transistor, wherein when the charge control signal takes a non-charging status, the two input terminals of the operational amplifier detect the voltage between the drain and the source of the PMOS transistor and then the operational amplifier provides the gate of the PMOS transistor with the output signal. The output signal is able to keep the above-mentioned voltage not higher than the preset voltage of the switch for retaining a low voltage drop and avoiding the switch from being burnt. Therefore, the present invention is able to solve the problem of the prior art that the battery and the conventional remote control power supply device are unable to simultaneously supply a system with power.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
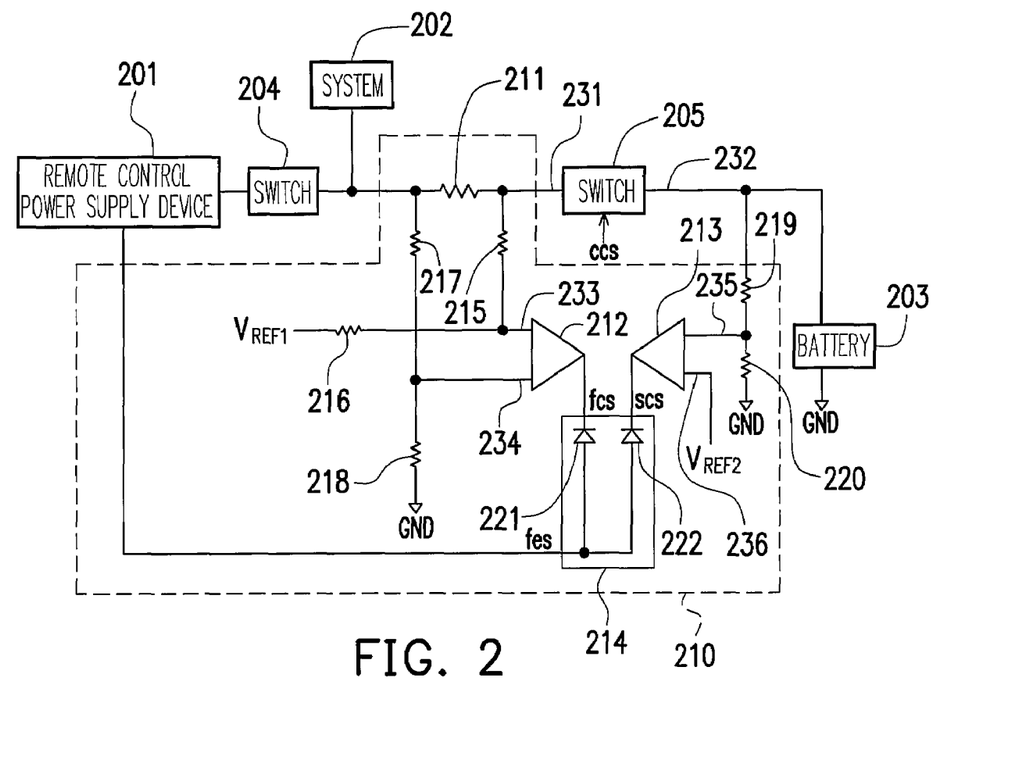
FIG. 2 is a circuit block diagram of a power supply system with a remote control circuit according to an embodiment of the present invention.

FIG. 2 is a circuit block diagram of a power supply system with a remote control circuit according to an embodiment of the present invention. The power supply system includes a remote control power supply device 201, a system 202, a battery 203, a first switch 204, a second switch 205 and a remote control circuit 210. The remote control circuit 210 includes a first resistor 211, a first operational amplifier 212, a second operational amplifier 213, a selection circuit 214, a second resistor 215, a third resistor 216, a fourth resistor 217, a fifth resistor 218, a sixth resistor 219 and a seventh resistor 220.

Herein the first terminal 231 of the second switch 205 is coupled to the system 202 through the first resistor 211. The first terminal 231 of the second switch 205 is also coupled to the remote control power supply device 201 through the first resistor 211 and the first switch 204, while the second terminal 232 thereof is coupled to the battery 203. When the remote control power supply device 201 is present, the first switch 204 is on, otherwise the first switch 204 is off. The second switch 205 receives a charge control signal ccs come from an embedded controller (EC, not shown in FIG. 2). If the charge control signal ccs takes a charging status, the second switch 205 is on in a bidirectional way; if the charge control signal ccs takes a non-charging status, the second switch 205 is on in a unidirectional way from the battery 203 to the system 202.

The above-mentioned charge control signal ccs is provided by the EC according to the information of the battery 203, and the information of the battery 203 can be one of the battery capacity, current, temperature and voltage. Taking the information of battery capacity as an example, assuming the preset value of the remained battery capacity is 95%, if the capacity of the battery 203 is lower than 95%, the charge control signal ccs takes the charging status, otherwise, the charge control signal ccs takes the non-charging status. The above-mentioned charging status is one of logic '0' and logic '1', while the non-charging status is another one of logic '0' and logic '1' rather than the same logic value as the charging status.

The first operational amplifier 212 takes advantage of the voltage drop between both ends of the first resistor 211 for detecting the charging current delivered to the battery 203. In more detail, the inverting input terminal 233 of the first operational amplifier 212 is coupled to the first resistor 211 and the first terminal 231 of the second switch 205 through the second resistor 215, the inverting input terminal 233 of the first operational amplifier 212 is coupled to the first reference voltage $V_{REF1}$ through the third resistor 216, the non-inverting input terminal 234 of the first operational amplifier 212 is coupled to the first resistor 211 and the system 202 through the fourth resistor 217 and the non-inverting input terminal 234 of the first operational amplifier 212 is coupled to the grounding voltage GND through the fifth resistor 218. With the above-mentioned wiring scheme, the first operational amplifier 212 is able to detect the charging current delivered to the battery 203 and then output the first control signal fcs according to the detection result. However, the present embodiment does not limit the first operational amplifier 212 to adopt the above-mentioned wiring scheme with the above-mentioned resistors. In fact, in order to detect the charging current delivered to the battery 203, other feasible wiring schemes can be used.

The second operational amplifier 213 is for detecting the voltage of the battery 203. In more detail, the non-inverting input terminal 235 of the second operational amplifier 213 is coupled to the battery 203 through the sixth resistor 219, the non-inverting input terminal 235 of the second operational amplifier 213 is coupled to the grounding voltage GND through the seventh resistor 220, the inverting input terminal 236 of the second operational amplifier 213 is coupled to the second reference voltage $V_{REF2}$ and the second operational amplifier 213 outputs the second control signal scs according to the detection result. However, the present embodiment does not limit the second operational amplifier 213 to adopt the above-mentioned wiring scheme with the above-mentioned resistors. In fact, in order to detect the voltage of the battery 203, other feasible wiring schemes can be used.

The selection circuit 214 receives the first control signal fcs and the second control signal scs and outputs one of the two control signals with a lower voltage. The output control signal from the selection circuit 214 is served as a remote control signal fcs to adjust the voltage of the remote control power supply device 201, so as to make the voltage of the remote control power supply device 201 approximated to the voltage of the battery 203 and to control the charging current of the battery not beyond the preset value. In this way, the power supply system with a remote control circuit of the present invention is able to make the remote control power supply device 201 supply the system 202 with power and charge the battery, wherein when the load of the system 202 is not greater than the remote control power supply device 201, both the remote control power supply device 201 and the battery 203 simultaneously supply the system 202 with power. In addition, the power supply system with a remote control circuit of the present invention can also timely turn on the second switch 205 according to the capacity of the battery 203, so as to charge or discharge the battery 203.

In the embodiment, the above-mentioned selection circuit 214 includes a first diode 221 and a second diode 222. The cathode of the first diode 221 receives the first control signal fcs, the cathode of the second diode 222 receives the second control signal scs, the anodes of the two diodes are coupled to a node where the remote control signal fes is output from to the remote control power supply device 201, so that the remote control power supply device 201 is able to adjust the output voltage to approximate the voltage of the battery 203 according to the remote control signal fes and to control the battery charging current not beyond the preset value. However, the embodiment does not limit the selection circuit 214 to utilize the diodes for selecting the first control signal fcs and the second control signal scs only. Anyone skilled in the art can modify the above-mentioned configuration according to a practical requirement.

Figure 3:
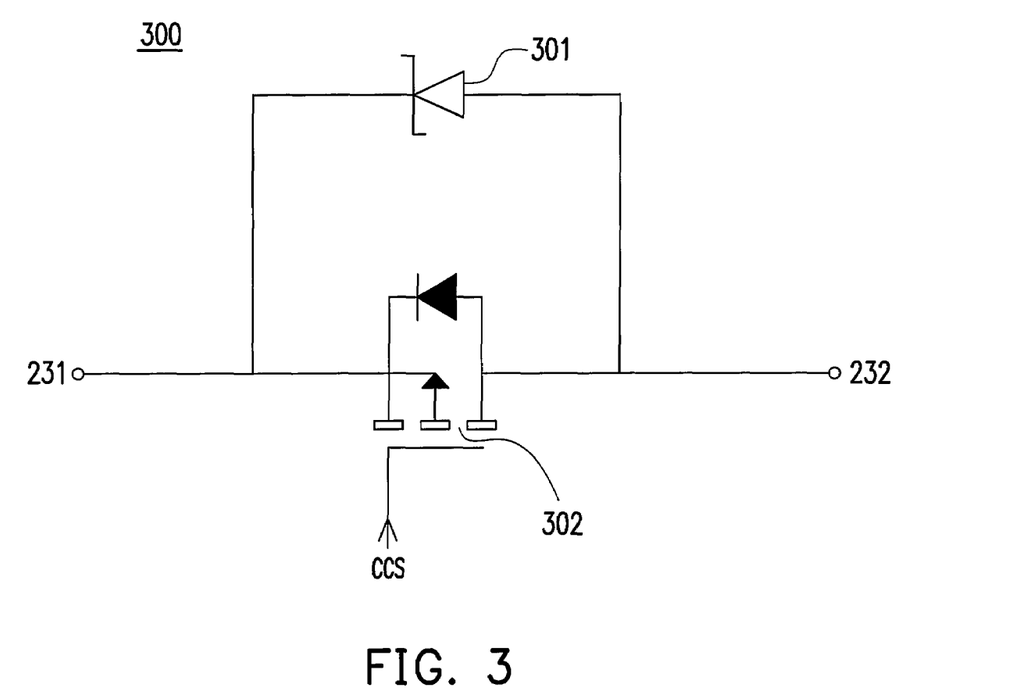
FIG. 3 is a circuit drawing 300 of the second switch 205 according to an embodiment of the present invention.

FIG. 3 is a circuit drawing 300 of the second switch 205 according to an embodiment of the present invention. Referring to FIGS. 3 and 2, the second switch 205 in FIG. 3 can alternatively includes a Schottky diode 301 and a PMOS transistor 302. Herein the anode of the Schottky diode 301 is coupled to the first terminal 231 of the second switch 205 and the cathode of the Schottky diode 301 is coupled to a node between the second terminal 232 of the second switch 205 and the PMOS transistor 302. If the anode voltage of the Schottky diode 301 is greater than the cathode voltage thereof, the battery 203 provides the system 202 with power through the Schottky diode 301.

The source of the PMOS transistor 302 is coupled to the first terminal 231 of the second switch 205, the drain thereof is coupled to the second terminal 232 thereof and the PMOS transistor 302 is turned on or off according to the charge control signal ccs. For example, if the capacity of the battery 203 is lower than the preset value (for example, 95%), the EC outputs a charge control signal ccs with logic '0' (i.e. the charging status) to turn on the PMOS transistor 302 so as to make the remote control power supply device 201 charge the battery 203; if the capacity of the battery 203 is higher than 95%, the EC outputs a charge control signal ccs with logic '1' (i.e. the non-charging status) to turn off the PMOS transistor 302 so as to disable the remote control power supply device 201 to charge the battery 203.

Figure 4:
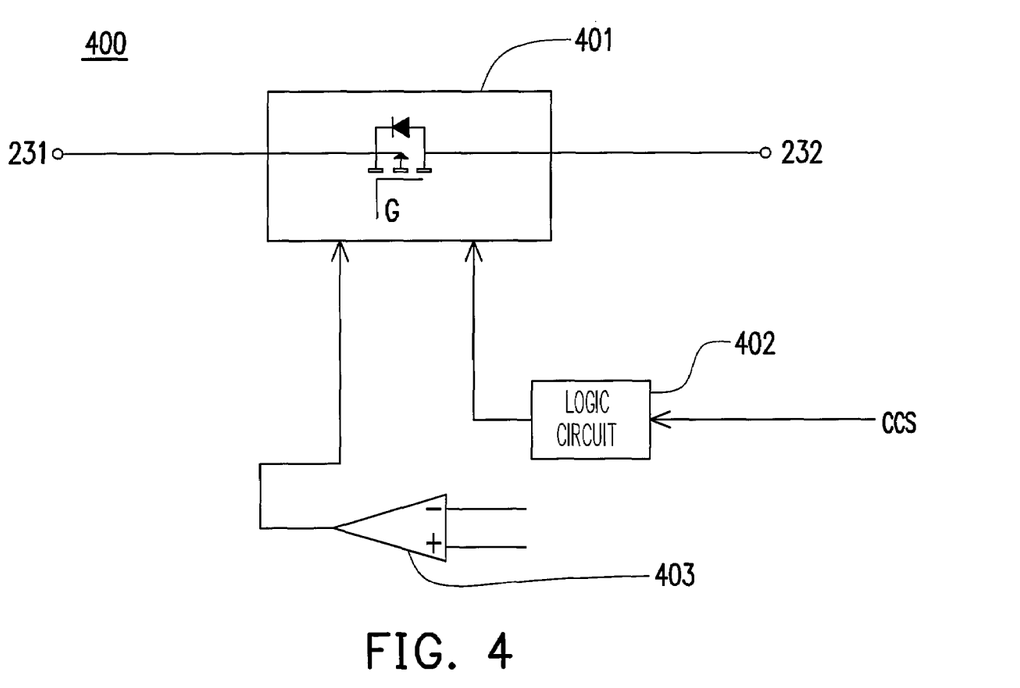
FIG. 4 is another circuit drawing 400 of the second switch 205 according to an embodiment of the present invention.

FIG. 4 is another circuit drawing 400 of the second switch 205 according to an embodiment of the present invention. Referring to FIGS. 4 and 2, the second switch 205 in FIG. 4 includes a PMOS transistor 401, a logic circuit 402 and a third operational amplifier 403. Herein the source of the PMOS transistor 401 is coupled to the first terminal 231 of the second switch 205, while the drain thereof is coupled to the second terminal 232 of the second switch 205. The logic circuit 402 performs a logic operation on the charge control signal ccs and then delivers the operated charge control signal ccs to the gate of the PMOS transistor 401, so that the PMOS transistor 401 can be on or off according to the obtained charge control signal ccs after the operation of the logic circuit 402. In the embodiment, the logic circuit 402 is an inverter.

The inverting input terminal of the third operational amplifier 403 receives the drain voltage signal of the PMOS transistor 401, while the non-inverting input terminal thereof receives the source voltage signal of the PMOS transistor 401.

In this way, the third operational amplifier 403 is able to detect the voltage between the source and the drain of the PMOS transistor 401 and to deliver an output signal to the gate of the PMOS transistor 401, so that when the charge control signal ccs is logic '0' (at the point, '0' means the non-charging status) the PMOS transistor 401 is able to use the output signal to keep the above-mentioned voltage not higher than the preset voltage of the second switch 205 (33 mV in the embodiment). Therefore, once the load of the system 202 gets instantaneously increased, the second switch 205 would respond as a Schottky diode to keep the voltage drop between both terminals of the second switch 205 at 33 mV, which enables the battery 203 to reduce power loss during supplying power, avoids the second switch 205 from damage due to an excessive power loss, and solves the heat dissipation problem of the second switch 205.

Figure 5:
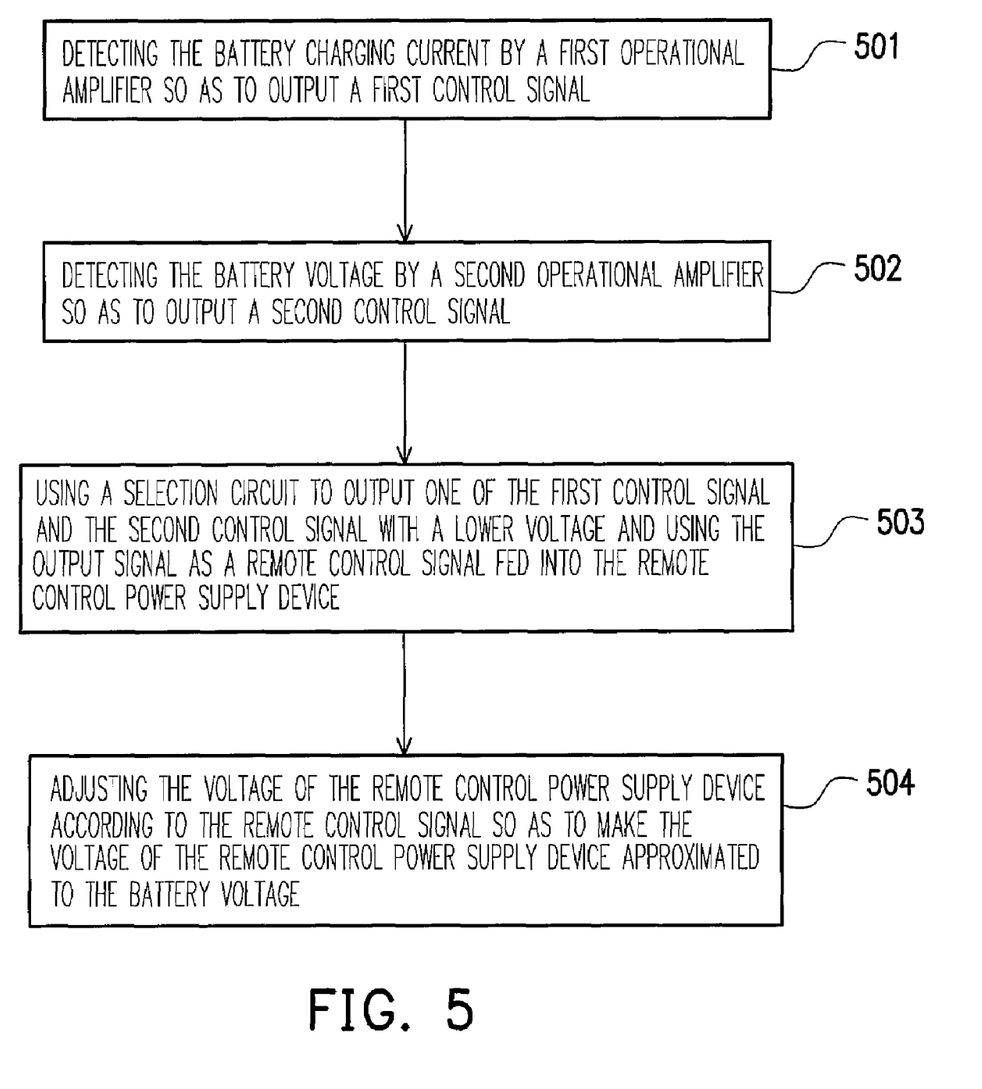
FIG. 5 is a flowchart of a power supply system operation method according to an embodiment of the present invention.

FIG. 5 is a flowchart of a power supply system operation method according to an embodiment of the present invention. Referring to FIGS. 5 and 2, in the power supply system, first, the first operational amplifier 212 is used to detect the charging current of the battery 203 for outputting the first control signal fcs (step 501 in FIG. 5). Next, the second operational amplifier 213 detects the voltage of the battery 203 to output the second control signal scs (step 502 in FIG. 5). Then, the selection circuit 214 is used to output one of the first control signal fcs and the second control signal scs with a lower voltage, and the output signal is served as the remote control signal fes to be fed into the remote control power supply device 201 (step 503 in FIG. 5). Further, the voltage of the remote control power supply device 201 is adjusted according to the remote control signal fes, so that the voltage of the remote control power supply device 201 is approximated to the voltage of the battery 203 (step 504 in FIG. 5) and the battery charging current is controlled not beyond the preset value.

The power supply system described by FIG. 5 further includes a switch (i.e. the second switch 205 in FIGS. 2, 3 and 4, thus the switch is termed as the second switch 205 hereinafter). The operation method and the circuit of the second switch 205 is omitted herein for simplicity, but the operation relationship between the second switch 205 and the remote control power supply device 201 and the battery 203 is explained by FIG. 6.

Figure 6:
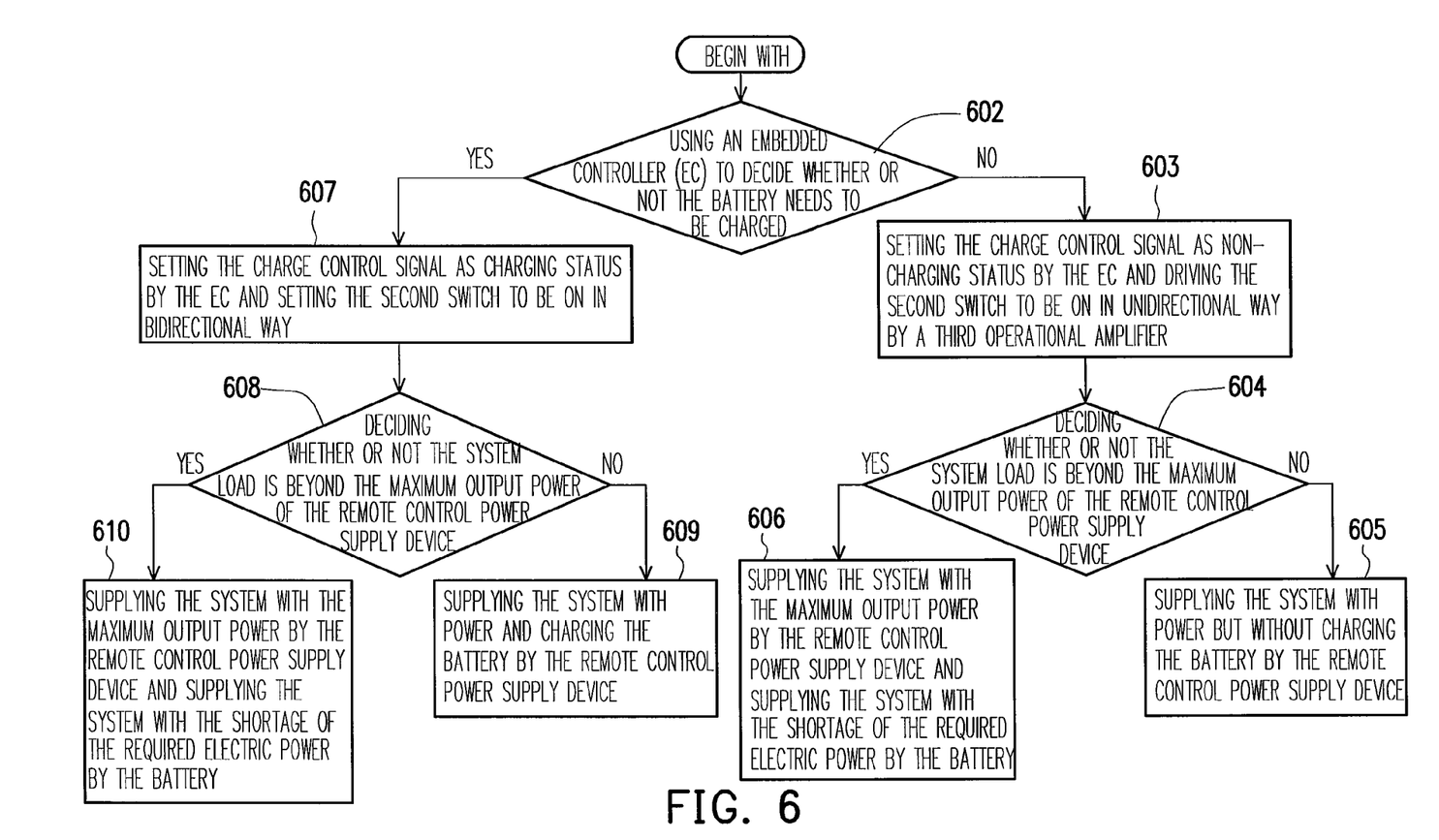
FIG. 6 is another flowchart of a power supply system operation method according to an embodiment of the present invention.

FIG. 6 is another flowchart of a power supply system operation method according to an embodiment of the present invention. Referring to FIGS. 6 and 2, first, the EC of the power supply system decides whether or not the battery 203 needs to be charged (step 602 in FIG. 6). In more detail, the EC decides whether or not the battery 203 needs to be charged according to the information of the battery 203, i.e. one of battery capacity, current, temperature and voltage. Taking the information of battery capacity as an example, assuming the preset value of the remained capacity of the battery 203 is 95%, if the remained capacity of the battery 203 is lower than 95%, the EC would decide that the battery 203 needs to be charged. At the point, if the EC decides the battery 203 not to be charged, the EC would set the charge control signal ccs as the non-charging status, the third operational amplifier 403 would drive the second switch 205 to be on in a unidirectional way (step 603 in FIG. 6). Then, the EC would decide whether or not the load of the system 202 is beyond the maximum output power of the remote control power supply device 201 (step 604 in FIG. 6). If the load of the system 202 is not beyond the maximum output power of the remote control power supply device 201, the remote control power supply device 201 would supply the system 202 with power, but would not charge the battery 203 (step 605 in FIG. 6). If the load of the system 202 is beyond the maximum output power of the remote control power supply device 201, the remote control power supply device 201 would supply the system 202 with the maximum output power and the battery 203 would provide the system 202 with the shortage of the electric power (step 606 in FIG. 6). At the point, the second switch 205 is driven by the third operational amplifier 403 and has a lower voltage drop in a forward direction, so as to be on in a unidirectional way and demonstrate low power loss characteristic.

However, if the EC decides the battery 203 to be charged, the EC would set the charge control signal ccs as the charging status and set the second switch 205 open, which makes the second switch 205 be on in a bidirectional way (step 607 in FIG. 6). Thereafter, the load of the system 202 is judged whether to be beyond the maximum output power of the remote control power supply device 201 (step 608 in FIG. 6). If the load of the system 202 is not beyond the maximum output power of the remote control power supply device 201, the remote control power supply device 201 would supply the system 202 with power and charge the battery 203 (step 609 in FIG. 6).

If the load of the system 202 is beyond the maximum output power of the remote control power supply device 201, since the load of the system 202 is already beyond the maximum output power of the remote control power supply device 201 at this point, the output voltage level from the remote control power supply device 201 drops and the remote control power supply device 201 has no extra electric power for charging the battery 203, therefore, the remote control power supply device 201 is disabled to charge the battery 203 (step 610 in FIG. 6), while the remote control power supply device 201 still keeps supplying the system 202 with power. Meanwhile, the battery 203 provides the system 202 with the shortage of the electric power, and the battery is in discharging status rather than in charging status.

In summary, the present invention uses two operational amplifiers to respectively detect the battery charging current and the battery voltage, and selects one of the two operational amplifiers to output a feedback into the remote control power supply device for adjusting the voltage of the remote control power supply device, so that the voltage of the remote control power supply device is approximated to the battery voltage and the battery charging current is controlled not beyond the preset value. Therefore, the power supply system and the power supply system operation method of the present invention allow the remote control power supply device and the battery to simultaneously supply a system with power. Moreover, by an appropriate design, the output voltage of the remote control power supply device can be varied within 9-13V range to approximate the battery output voltage and to meet the requirement of the proposal 'Narrow VDC 2' launched by Intel company, and the volume of the remote control power supply device can be flexibly designed as well.

Besides, for another configuration in the present invention where an operational amplifier and a PMOS transistor are used to form the switch coupled to the battery, when the charge control signal takes a non-charging status, the two input terminals of the operational amplifier are used to detect the voltage between the source and the drain of the PMOS transistor and then the operational amplifier provides an output signal to the gate of the PMOS transistor. The output signal is able to make the switch on in a unidirectional way (from the battery to the system only) and to keep the voltage drop between the two terminals of the switch not higher than the preset voltage of the switch, therefore, the configuration is also able to avoid the switch from being burnt and to solve the problem of the prior art that the battery and the remote control power supply device are unable to simultaneously supply the system with power.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply system with a remote control circuit, wherein the remote control circuit comprising:
   a first resistor, coupled between a remote control power supply device and a battery;
   a first operational amplifier, coupled to the first resistor for detecting the current passing through the first resistor so as to output a first control signal;
   a second operational amplifier, coupled to the battery for detecting the voltage of the battery so as to output a second control signal; and
   a selection circuit, coupled between the first operational amplifier, the second operational amplifier and the remote control power supply device for outputting one of the first control signal and the second control signal with a lower voltage, wherein the output signal is served as a remote control signal to adjust the voltage of the remote control power supply device, so that the voltage of the remote control power supply device is approximated to the voltage of the battery.

2. The power supply system according to claim 1, wherein the remote control signal is further for controlling the charging current of the battery not beyond a preset value.

3. The power supply system according to claim 1, wherein both input terminals of the first operational amplifier are respectively coupled to both ends of the first resistor.

4. The power supply system according to claim 3, wherein the remote control circuit further comprises:
   a second resistor, wherein an end thereof is coupled to the first resistor and the battery, while another end thereof is coupled to the inverting input terminal of the first operational amplifier;
   a third resistor, coupled between a first reference voltage and the inverting input terminal of the first operational amplifier;
   a fourth resistor, wherein an end thereof is coupled to the first resistor and the remote control power supply device, while another end thereof is coupled to the non-inverting input terminal of the first operational amplifier; and
   a fifth resistor, wherein an end thereof is coupled to the non-inverting input terminal of the first operational amplifier, while another end is grounded.

5. The power supply system according to claim 1, wherein the non-inverting input terminal of the second operational amplifier is coupled to the first resistor and the battery, while the inverting input terminal of the second operational amplifier receives a second reference voltage.

6. The power supply system according to claim 5, wherein the remote control circuit further comprises:
   a sixth resistor, wherein an end thereof is coupled to the first resistor and the battery, while another end thereof is coupled to the non-inverting input terminal of the second operational amplifier; and
   a seventh resistor, wherein an end thereof is coupled to the non-inverting input terminal of the second operational amplifier, while another end thereof is grounded.

7. The power supply system according to claim 1, wherein the selection circuit comprises:
- a first diode, wherein the cathode thereof receives the first control signal; and
- a second diode, wherein the cathode thereof receives the second control signal; wherein
- the anodes of the above-mentioned two diodes are coupled to a node and the node outputs the remote control signal.

8. The power supply system according to claim 1, further comprising:
- a first switch, wherein a terminal thereof is coupled to the remote control power supply device, another terminal thereof is coupled to the battery and a system, and if the remote control power supply device is present, the first switch is on, otherwise, the first switch is off.

9. The power supply system according to claim 1, further comprising:
- a second switch, wherein the first terminal thereof is coupled to the first resistor and the system and the second terminal thereof is coupled to the battery and receives a charge control signal; if the charge control signal takes a charging status, the second switch is on in bidirectional way; if the charge control signal takes a non-charging status, the second switch is on in a unidirectional way from the battery to the system.

10. The power supply system according to claim 9, wherein the charging status is one of logic '0' and logic '1', while the non-charging status is another one of logic '0' and logic '1' rather than the charging status.

11. The power supply system according to claim 9, wherein the charge control signal comes from an embedded controller and the embedded controller provides the charge control signal according to the information of the battery.

12. The power supply system according to claim 11, wherein the information of the battery is one of battery capacity, current, temperature and voltage.

13. The power supply system according to claim 9, wherein if the capacity of the battery is lower than a first preset value, the charge control signal takes the charging status, otherwise, the charge control signal takes the non-charging status.

14. The power supply system according to claim 9, wherein the second switch comprises:
- a Schottky diode, coupled between the first terminal and the second terminal of the second switch; and
- a PMOS transistor, wherein the source thereof is coupled to the first terminal of the second switch, the drain thereof is coupled to the second terminal of the second switch and the PMOS transistor is on or off according to the charge control signal.

15. The power supply system according to claim 9, wherein the second switch comprises:
- a PMOS transistor, wherein the source thereof is coupled to the first terminal of the second switch, while the drain thereof is coupled to the second terminal of the second switch;
- a logic circuit, used for performing a logic operation on the charge control signal and delivering the operated charge control signal to the gate of the PMOS transistor; and
- a third operational amplifier, wherein when the charge control signal takes the non-charging status, the two input terminals thereof detect the voltage between the source and the drain of the PMOS transistor and an output signal is provided to the gate of the PMOS transistor, and the output signal controls the PMOS transistor to be on in a unidirectional way and keeps the conductive voltage drop not higher than a preset voltage.

16. The power supply system according to claim 15, wherein the logic circuit comprises an inverter.

17. A power supply system operation method, for supplying a system with power by a remote control power supply device and a battery; the operation method comprising:
- detecting the battery charging current by a first operational amplifier so as to output a first control signal;
- detecting the battery voltage by a second operational amplifier so as to output a second control signal;
- using a selection circuit to output one of the first control signal and the second control signal with a lower voltage and using the output signal as a remote control signal fed into the remote control power supply device; and
- adjusting the voltage of the remote control power supply device according to the remote control signal so as to make the voltage of the remote control power supply device approximated to the battery voltage.

18. The power supply system operation method according to claim 17, further comprising controlling the charging current of the battery not beyond a preset value.

19. The power supply system operation method according to claim 17, wherein the power supply system further comprises a switch, the first terminal of the switch is coupled to the remote control power supply device and the system, the second terminal thereof is coupled to the battery and receives a charge control signal; if the charge control signal takes a charging status, the switch is on in a bidirectional way; if the charge control signal takes a non-charging status, the switch is on in a unidirectional way from the battery to the system.

20. The power supply system operation method according to claim 19, wherein the charging status is one of logic '0' and logic '1', while the non-charging status is another one of logic '0' and logic '1' rather than the charging status.

21. The power supply system operation method according to claim 20, wherein the charge control signal comes from an embedded controller and the embedded controller provides the charge control signal according to a piece of information of the battery.

22. The power supply system operation method according to claim 21, wherein the information of the battery is one of battery capacity, current, temperature and voltage.

23. The power supply system operation method according to claim 19, wherein if the capacity of the battery is lower than a preset value, the charge control signal takes the charging status, otherwise, the charge control signal takes the non-charging status.

24. The power supply system operation method according to claim 23, further comprising:
- if the load of the system is beyond the maximum output power of the remote control power supply device, providing the system with the maximum output power by the remote control power supply device and providing the system with the shortage of the required electric power by the battery;
- if the battery capacity is higher than the preset value and the load of the system is not beyond the maximum output power of the remote control power supply device, providing the system with power by the remote control power supply device and not charging the battery; and
- if the battery capacity is lower than the preset value and the load of the system is not beyond the maximum output power of the remote control power supply device, providing the system with power and charging the battery by the remote control power supply device.

25. The power supply system operation method according to claim 24, further comprising:

if the battery capacity is lower than the preset value and the load of the system is beyond the maximum output power of the remote control power supply device, disabling the remote control power supply device to charge the battery.

26. The power supply system operation method according to claim 20, wherein the switch comprises a PMOS transistor, the source of the PMOS transistor is coupled to the first terminal of the switch, while the drain thereof is coupled to the second terminal of the switch and the power supply system operation method further comprises:

performing a logic operation on the charge control signal and delivering the operated charge control signal to the gate of the PMOS transistor; and when the charge control signal takes the non-charging status, providing an output signal to the gate of the PMOS transistor by a third operational amplifier according to the voltage between the source and the drain of the PMOS transistor, wherein the output signal controls the PMOS transistor to be on in a unidirectional way and keeps the conductive voltage drop not higher than a preset voltage.

27. The power supply system operation method according to claim 26, wherein the logic operation comprises an inverting operation.

* * * * *